United States Patent [19]
Tsuda et al.

[11] Patent Number: 5,293,918
[45] Date of Patent: Mar. 15, 1994

[54] PNEUMATIC RADIAL TIRES

[75] Inventors: Toru Tsuda; Masayuki Tokutake, both of Tokyo; Misao Kawabata, Tokorozawa City; Yutaka Yamaguchi, Urawa, all of Japan

[73] Assignee: Bridgestone Corporation, Tokyo, Japan

[21] Appl. No.: 908,805

[22] Filed: Jul. 7, 1992

Related U.S. Application Data

[63] Continuation of Ser. No. 592,095, Oct. 3, 1990, abandoned.

[30] Foreign Application Priority Data

| Oct. 12, 1989 | [JP] | Japan | 1-263952 |
| Dec. 8, 1989 | [JP] | Japan | 1-317840 |
| Dec. 22, 1989 | [JP] | Japan | 1-331077 |

[51] Int. Cl.$^5$ ............................................. B60C 11/03
[52] U.S. Cl. ............................ 152/209 R; 152/DIG. 1; 152/209 A
[58] Field of Search .......... 152/209 R, 209 D, 209 A, 152/DIG. 1

[56] References Cited

U.S. PATENT DOCUMENTS

| 2,290,625 | 7/1942 | Stein | 152/209 R |
| 2,604,920 | 7/1952 | Kirby | 152/209 R |
| 2,843,172 | 7/1958 | Berry et al. | |
| 4,550,756 | 11/1985 | Hinkel | 152/209 R |
| 4,796,683 | 1/1989 | Kawabata et al. | 152/209 R |
| 4,840,211 | 6/1989 | Makino | 152/209 R |
| 5,016,695 | 5/1991 | Kuze et al. | 152/209 R |

FOREIGN PATENT DOCUMENTS

| 2444576 | 12/1979 | France | B60C 11/06 |
| 60-179306 | 1/1986 | Japan | B60C 11/06 |
| 63-312204 | 12/1988 | Japan | 152/209 R |
| 1-95910 | 4/1989 | Japan | 152/209 D |
| 2-225107 | 9/1990 | Japan | 152/209 R |
| 0962034 | 9/1982 | U.S.S.R. | |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic radial tire comprises a tread provided with a plurality of circumferential grooves extending in a circumferential direction of the tire, and plural rows of land portions defined between axially adjacent circumferential grooves and between each of edges of the tread and the adjacent main circumferential groove. That groove wall of at least the circumferential groove located nearest to at least one of the tread edges on a treading surface of the tread which is positioned on a side of the one of the tread edges is inclined to gradually increase a width of the groove toward the surface of the tread from a location spaced by 10–70% of a depth of the circumferential groove radially outwardly from a bottom thereof. The width of an opening of the circumferential groove to the surface of the tread is in a range of 3–18 mm.

9 Claims, 8 Drawing Sheets

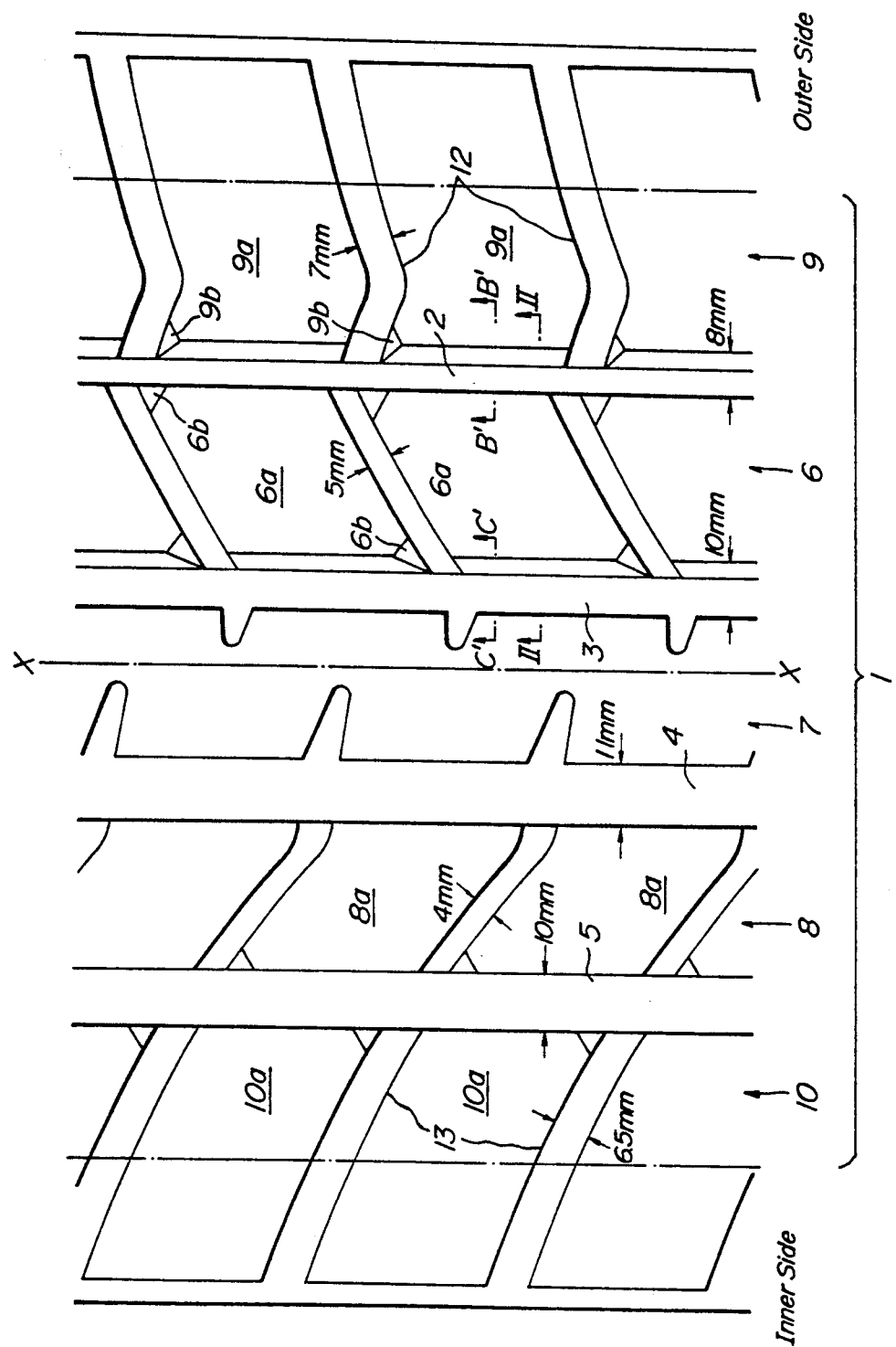

FIG_2
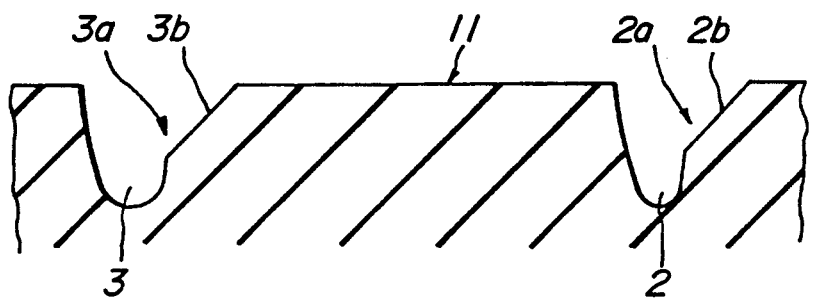
FIG_4a
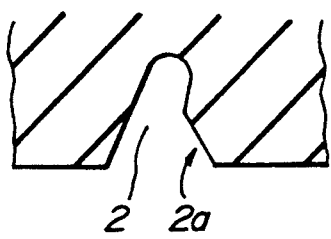
FIG_4b
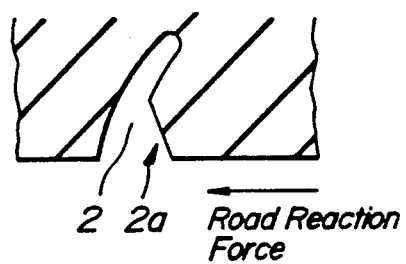

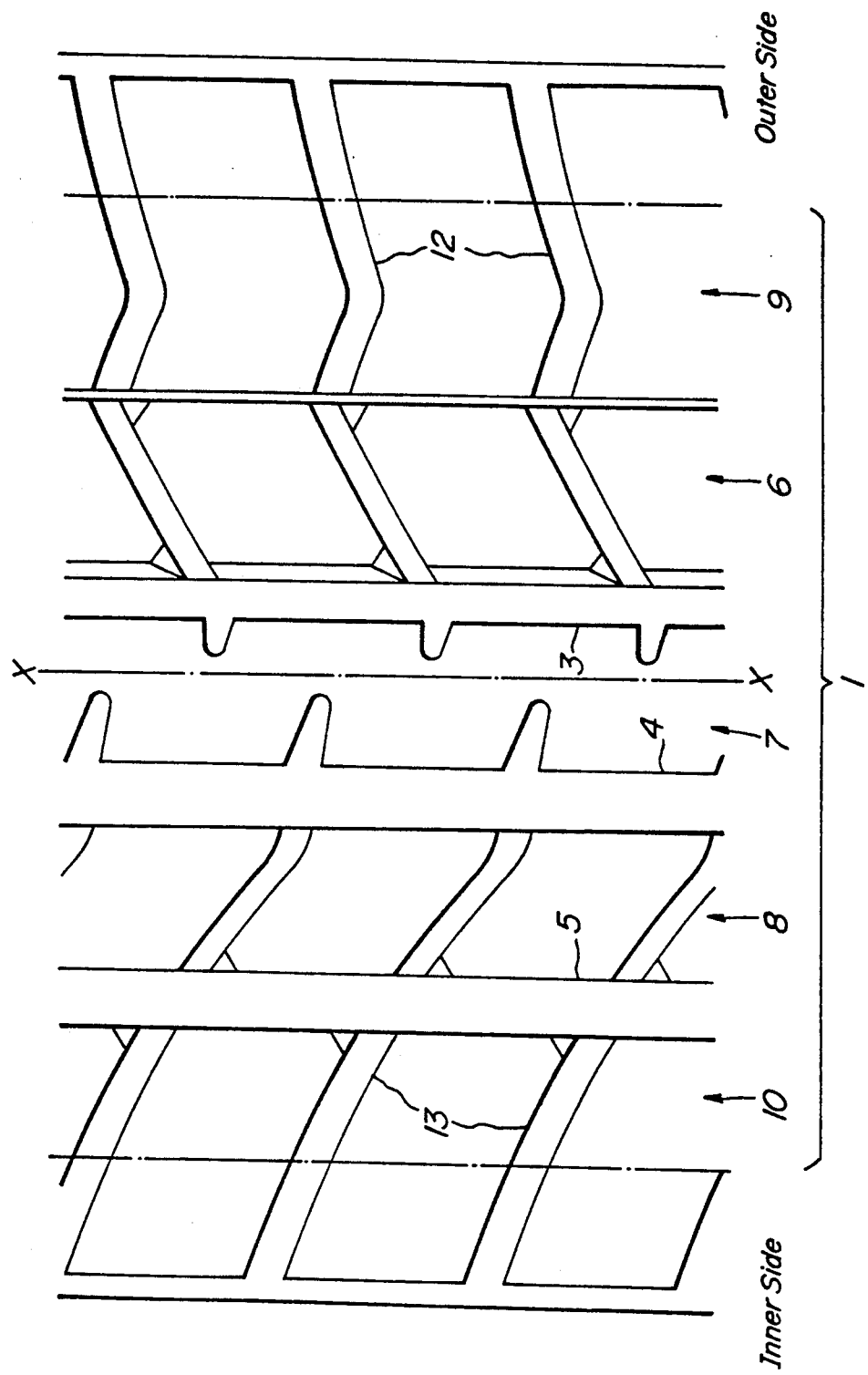

FIG_5a
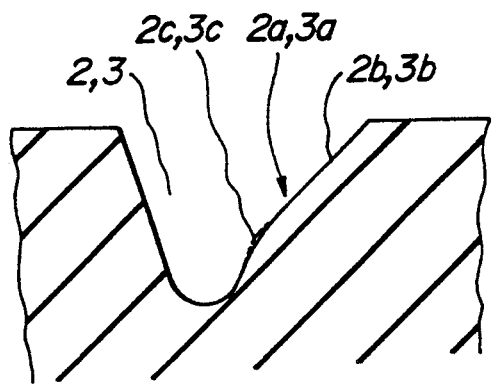
FIG_5b
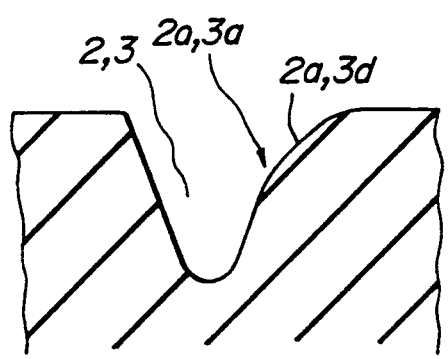

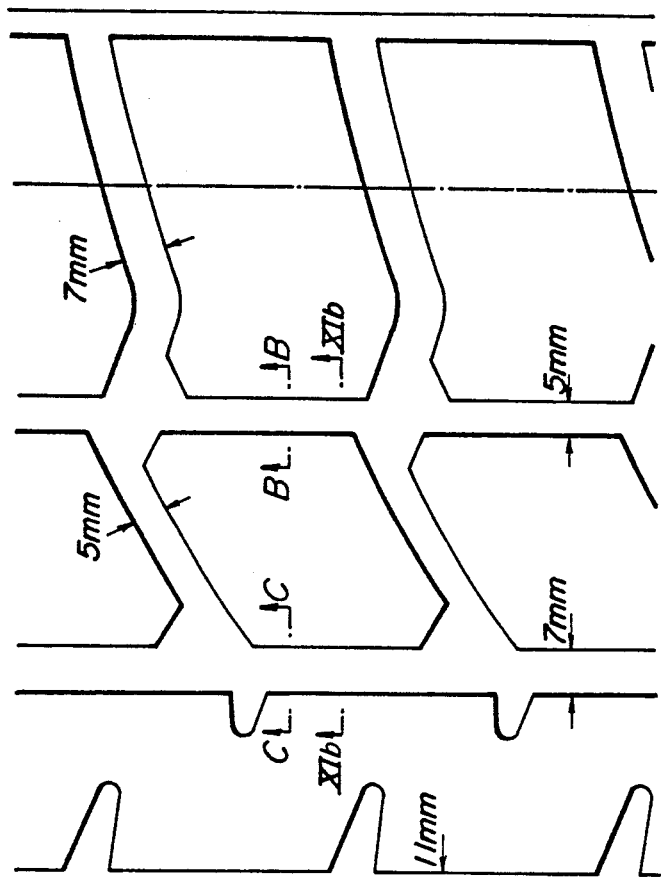
FIG._6a
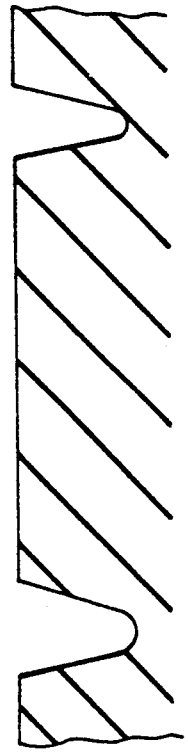
FIG._6b
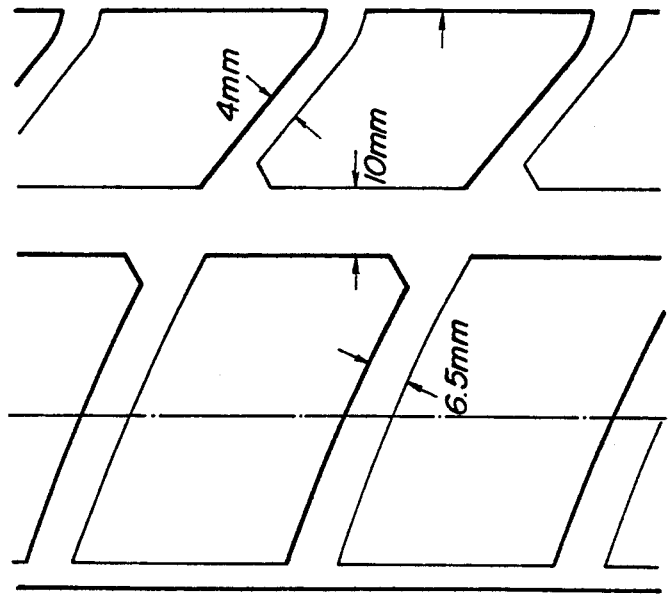

FIG_7
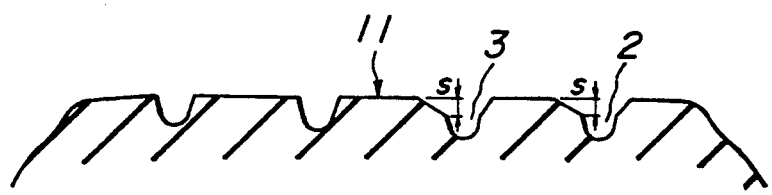
FIG_8
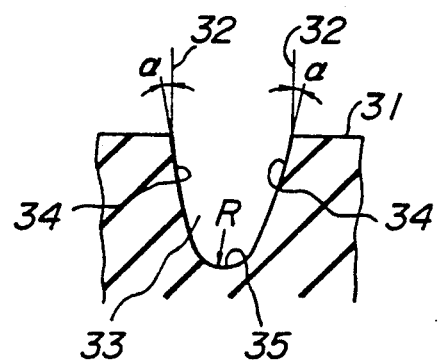

FIG_9
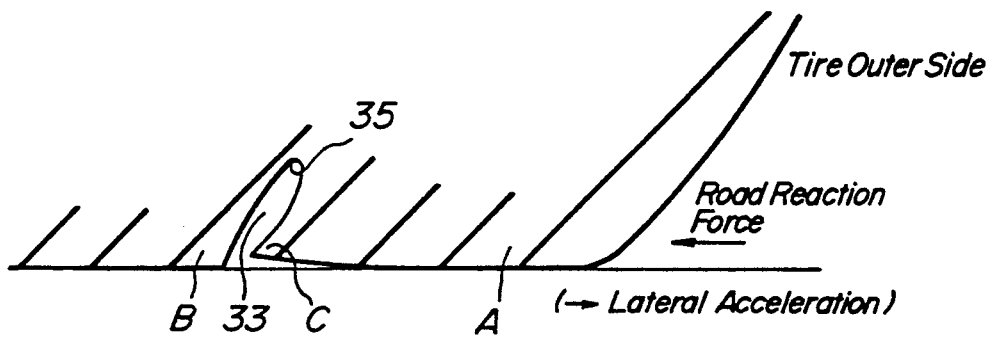
FIG_10
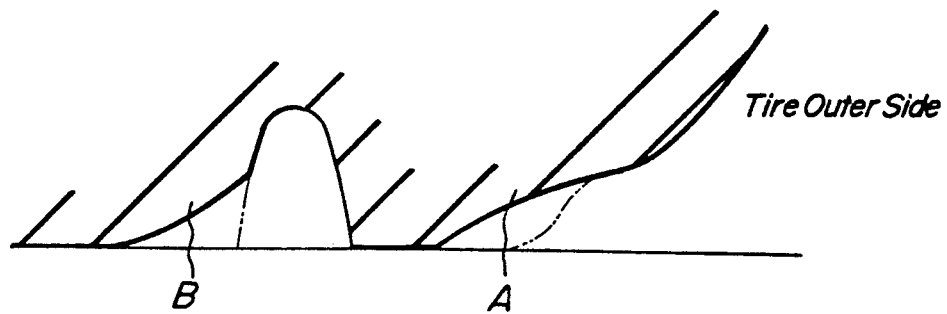

FIG_11
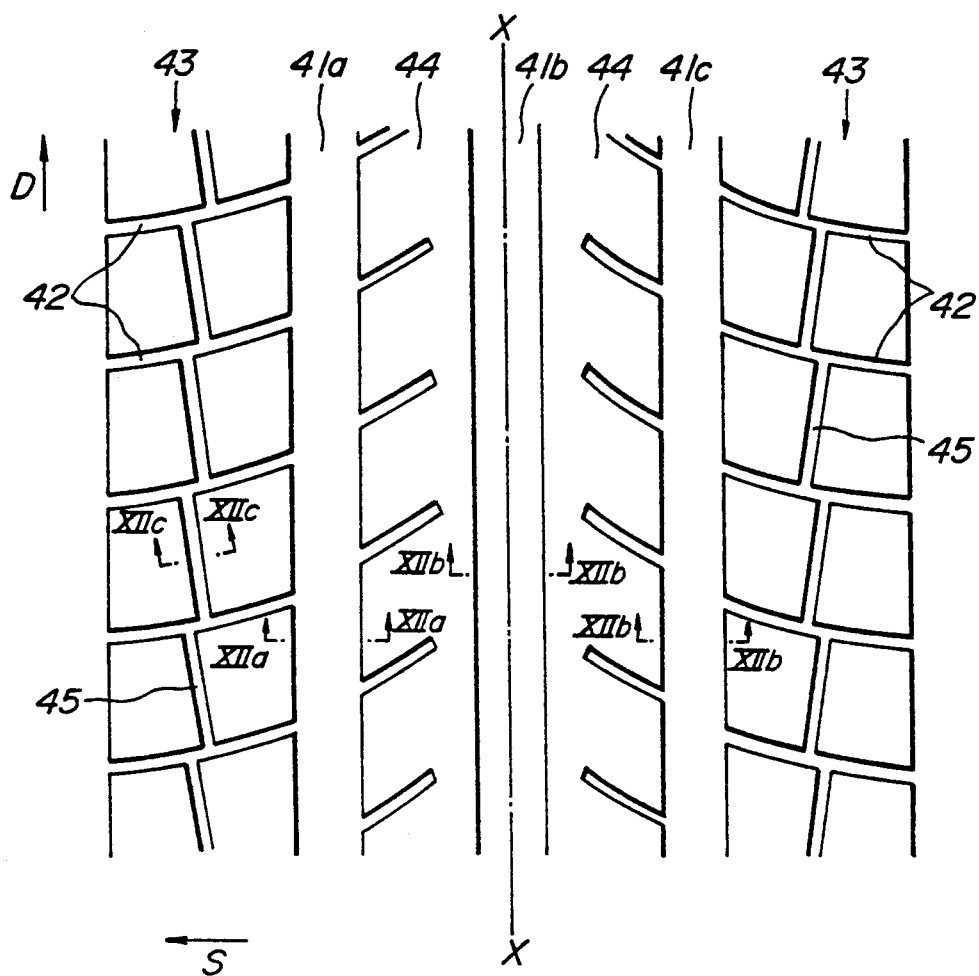
FIG_12a
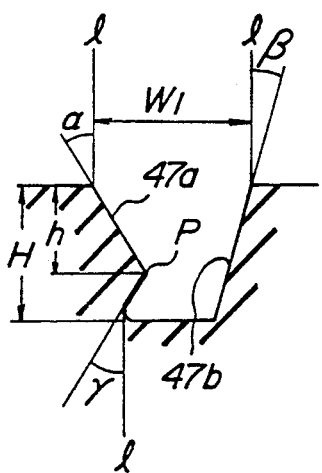
FIG_12b
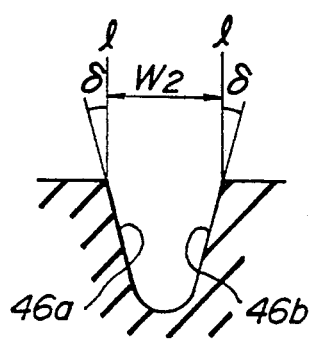
FIG_12c
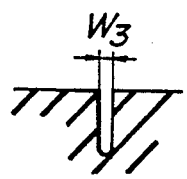

PNEUMATIC RADIAL TIRES

This is a continuation of application Ser. No. 07/592,095, filed Oct. 3, 1990 now abandoned.

BACKGROUND OF THE INVENTION

1. Field of the Invention

The present invention relates to high performance pneumatic radial tires, particularly to high performance pneumatic radial tires having uneven wear resistance greatly improved in use under the application of a large lateral acceleration without lowering drainage performance on wet roads.

2. Related Art Statement

As shown in a cross sectional view of FIG. 8, in a conventional pneumatic radial tire provided with a plurality of circumferential grooves extending zigzag or straight in the circumferential direction of the tire, it is a common practice that opposed groove walls 34 of each of the circumferential grooves 33 are spaced from each other toward the surface 31 of a tread such that angles α defined between normals 32 erected perpendicularly to the tread surface 31 and extensions of the opposed groove walls 34 may be equal to each other. Also, the groove walls 34 are connected together with a bottom wall 35 constituted by a curved surface 35 having a specific radius of curvature R.

However, in the conventional tire with the circumferential grooves having the above shape during, when a large lateral acceleration is applied to the circumferential groove during high speed running on a circuit or the like, the outer portion of the tire particularly positioned on the outer side of turning is deformed as shown in a sectional view of FIG. 9 owing to a collapse of the circumferential groove 33. Thus, that portion of the tread which comes to particularly firmly contact the ground owing to this deformation. That is, a shoulder portion A adjoining the treading surface of the tread and a land edge portion B adjoining the inside of the outermost circumferential groove 33 in the width direction of the tire bear great reaction forces from the road surface. As a result, as shown in FIG. 10, there is a problem in that both the portions A and B are abnormally worn at a relatively early state.

Under the circumferences, in order to solve the above problem, a trial has been made to improve a wearing profile by narrowing the width of the circumferential grooves to such a degree that the opposite groove walls may contact each other and consequently the deformation of the tire may be restrained in the state that the opposed groove walls contact each other. However, according to this technique, since the volume of the grooves of the tire becomes smaller, the drainage performance on the wet road inevitably deteriorates.

On the other hand, Japanese Patent Application Laid open No. 60-193,704 describes, a pneumatic tire having improved drainage performance, cornering stability and gripping property during turning improved. The tire has a cross angle of that entire groove wall relative to a normal line to the surface of a tread which is located outside in the axial direction of the tire between the opposed groove walls of each of circumferential grooves which is made greater than that of the other located inside in the tire axial direction. The cross angle between each of the axially outer groove walls and the normal is set in a range of 10°-30°. In this tire, since rigidity of the land portions defined by the outer groove walls increases, the above-mentioned uneven wear can be suppressed to some degree. However, since the outer wall of the circumferential groove is merely inclined from the bottom of the groove toward the surface of the tread to gradually increase the width of the groove, the circumferential groove is deformed in substantially the same manner as shown in FIG. 9 when a particularly large lateral acceleration is applied to the tire. Consequently, occurrence of abnormal wearing as shown in FIG. 10 cannot be prevented to a satisfactory degree.

Japanese Patent Application Laid-open No. 58-128,905 describes a tire in which walls of wavy or zigzag circumferential grooves are positioned on a side from which the tire is extracted from a mold are provided with groove-enlarging, inclined surface adjoining the treating surface, so that releasing of the tire from the mold may be facilitated in a full mold production process. According to this tire, the uneven worn state is even slightly improved. However, in this tire, since the circumferential groove positioned near the edge of the tread has a stepped portion on the groove wall having the above-mentioned groove-enlarging, inclined surface at a radially inner location, the groove wall of the circumferential groove is bent around the axially outer edge of the stepped portion when the tire receives great reaction forces from the road surface under application of a great lateral acceleration. As a result, the tire contacts the ground in a similar state shown in FIG. 9, and finally the tire is worn in the substantially same state shown in FIG. 10.

Further, Japanese Utility Model Registration Application Laid-open No. 63-72,024 describes a tire in which a chamfer continuing in the circumferential direction of the tire is provided in a contact between one of groove walls of a circumferentially annular groove and the surface of a tread. The inner edge of the chamfer as viewed in the radial direction of the tire is inwardly located in a range of 3-15% of the annular groove from the surface of the tread so that the tire may easily be released from a mold. However, although the worn state can only slightly be improved in this tire, the deformation as shown in FIG. 9 and the uneven wear as shown in FIG. 10 cannot effectively be prevented because the width of the cut is too small.

SUMMARY OF THE INVENTION

The present invention advantageously solves the above-mentioned problems encompassed by the prior art, and provide pneumatic radial tires in which uneven wearing can greatly be improved together with enhancement of cornering stability without deteriorating drainage performance.

The present invention relates to a pneumatic radial tire comprising a tread provided in a treading surface with a plurality of circumferential grooves extending zigzag or straight in a circumferential direction of the tire. A plurality of land portions are defined between adjacent circumferential grooves and between each of edges of the tread and an outermost circumferential groove. The groove wall of a circumferential groove which is located nearest to at least one of the tread edges on the treading surface of the tread, preferably to the axially outer tread edge of the tire in the state that the tire is fitted to a vehicle, is inclined to gradually increase a width of the groove toward the surface of the tread from 10-70% of a depth of the circumferential groove radially outwardly from a bottom of the groove, and a width of an opening of the circumferential groove to the surface of the tread is in a range of 3–18 mm.

According to a preferred embodiment of the present invention, one of the opposed groove walls of the circumferential groove is inclined to gradually increase the width of the groove from the bottom of the groove to the surface of the tread. The other wall of the groove is inclined more greatly than that of the one of the opposed groove walls of the circumferential groove to gradually increase the width of the groove from a certain position radially outsides the bottom of the groove to the surface of the tread. The other wall of the groove is inclined to gradually increase the width of the groove from the above certain position to the bottom of the groove.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIGS. 1 and 2 are a plane view of a tread pattern as an embodiment of the present invention and a sectional view thereof taken along a II—II line, respectively;

FIG. 3 is a plane view of a tread pattern of another embodiment of the present invention;

FIGS. 4a and 4b are sectional views illustrating a deformed state of a wall of a groove of a tire according to the present invention;

FIGS. 5a and 5b are sectional views illustrating a deformed state of another groove wall;

FIGS. 6a and 6b are a plane view of a tread pattern and a sectional view thereof taken along a line VI(b)—VI(b), respectively;

FIG. 7 is a sectional view illustrating a stepped portion measured;

FIG. 8 is the sectional view illustrating the sectional shape of a groove of the conventional tire;

FIGS. 9 and 10 are the sectional views of the deformed state and the uneven worn state of the conventional tire, respectively;

FIG. 11 is a developed view of still another tread pattern of the tire according to the present invention; and FIGS. 12a, 12b and 12c are sectional views of circumferential grooves taken along lines XII(a)—XII(a), XII(b)—XII(b) and XII(c)-XII(c) of FIG. 11, respectively.

DETAILED DESCRIPTION OF THE INVENTION

The present invention will first be explained with reference to FIG. 1. Four straight circumferential grooves 2 through 5 are provided in a treading surface 1 of a tread. Rows of land portions 6 through 10 are formed between the adjacent circumferential grooves and between edges of the tread and the circumferential grooves 2 and 5. As is clear from FIG. 2 in a cross sectional view taken along a line II—II, two circumferential grooves 2 and 3, which are located near the axially outer edge of the tread in such a posture that the tire is fitted to a vehicle, have groove walls 2a and 3a located on a side of the tread and constituted by forming inclined surfaces 2b and 3b inclined to gradually increase the width of the grooves from a location radially outside the bottom of the circumferential grooves 2 and 3, in this example, from 3 mm radially outside the groove bottom of the circumferential grooves 2 and 3 having the depth of 8 mm, to the surface of the tread 11, respectively. The widths of openings to the surface 11 of the tread of the circumferential grooves 2 and 3 are set at 8 mm and 10 mm, respectively.

When the circumferential groove located nearest to the axially outer edge of the tread is a thin groove having the width of less than 3 mm as shown in FIG. 3, wall grooves of the thin groove contact each other upon application of a large lateral acceleration. Consequently, abnormal wear of the shoulder portion of the tread and an edge portion of a land portion adjoining an axially inner side of the thin groove is suppressed. Thus, the circumferential groove located nearest to the edge of the tread as referred to herein means a circumferential groove having the groove width of not less than 3 mm axially inside the thin groove.

As shown in FIG. 9, the abnormal wearing of the conventional tire occurs due to the phenomenon that the groove wall of the circumferential groove 33 on the side of the axially outer edge of the tread falls down, upon application of reaction forces to the tire from the road, toward the radially inner side of the treading surface portion of the tread as if the groove bottom 35 acted as a fulcrum. Thus, the circumferential groove 33 is greatly collapsed to float the land portion C adjoining the outer side of the groove wall from the road. On the other hand, the circumferential grooves 2 and 3 of the tire according to the present invention take collapsed shapes even under an ordinary ground contacting state as shown in a cross sectional view of FIG. 4a with respect to the groove 2, one of the grooves shown in FIG. 1, by way of example. Since the location of the radially inner end of the inclined surface 2b is appropriately selected, even when the reaction forces act upon the tire from the road, as shown in FIG. 4b, the groove wall 2a of the circumferential groove 2 on the side of the axially outer edge of the tread is merely deformed to move almost in parallel toward the opposed groove wall. Consequently, since the groove wall 2a is effectively prevented from greatly falling down, the edge portion of the land portion axially outwardly adjoining the groove wall 2a still maintains the ground-contacting state. Thus, a certain level ground contact pressure is obtained by this land portion to contribute occurrence of gripping forces.

Therefore, according to the tire of the present invention, the entire land portions adjoining the circumferential groove 2 and 3 and located on the side of the axially outer edge of the tread can function without waste. The occurrence of abnormal wearing on the edge portions of these land portions as well as on those of the land portions, which are opposed thereto through the circumferential grooves 2 and 3 can effectively be prevented. In addition, since the circumferential grooves 2, 3 are not greatly collapsed and the groove volume of each of the circumferential grooves 2 and 3 itself is greater than that in the conventional tire, excellent drainage performance can always be assured.

Furthermore, since the entire land portions adjoining the circumferential grooves 2 and 3 and located on the side of the axially outer edge of the tread functions without waste, cornering stability can also advantageously be improved.

The reason why the width of the openings to the tread surface 11 of the circumferential grooves 2 and 3 is set in a range of 3-18 mm is that both the wet drainage performance and the abnormal wear resistance can effectively both be attained under action of the inclined surfaces 2b and 3b of the circumferential grooves in this range.

That is, if the width of the openings is less than 3 mm, it is practically impossible to assure the desired inclined surfaces 2b and 3b in relation to the groove depth. On the other hand, if the width is more than 18 mm, the inclined surfaces 2a and 3a produce the reaction forces against the deformation but the groove width is too large. In other words, since the width of the blocks becomes so small it is difficult to prevent uneven wearing by integrally restraining the movement of the blocks. Accordingly, the circumferential grooves are deformed as in the conventional manner.

FIG. 11 shows a principal portion of another embodiment of a tread of the pneumatic radial tire according to the present invention. The tread is divided into two circumferential rows 43 consisting of lateral blocks each located on opposite sides of the tread and two rows of ribs 44 in the central portion of the tread divided by three circumferential grooves 41a through 41c and a number of lateral grooves 42. The circumferential grooves extend along the circumference of the tread substantially parallel to one another while being spaced from adjacent one. The lateral grooves 42 connect the circumferential grooves 41b and 41c. Each of the vertical rows 43 of the blocks is provided with an auxiliary circumferential groove 45 extending zigzag along the circumference of the tread and having a width narrower than that of the circumferential groove.

The illustrated embodiment has an oriented pattern in which the lateral grooves 42 on the opposite sides form acute angles between the circumferential grooves 41a and 41c and extend in such a direction that they would converge toward the equator X of the tire, and their tip terminate in the ribs 44. In FIG. 11, arrows D and S show a rotating direction and an axially outer direction when the tire is fitted to a vehicle, respectively.

Although three circumferential grooves are provided in this embodiment, it is preferable to provide three to six circumferential grooves. The width and the depth of the lateral grooves 42 are made equal to or smaller than those of the circumferential grooves, respectively.

FIGS. 12a through 12c show sectional views of the circumferential grooves 41a, the circumferential groove 41b and 41c, and the auxiliary circumferential groove 45, respectively.

The circumferential grooves 41b and 41c excluding the circumferential groove 41a, which is arranged on the axially outer side of the vehicle in the state that the tire is fitted to the vehicle, take a shape similar to that in the conventional tire as shown in FIG. 12b. That is, angles δ defined between opposed groove walls 46a and 46b of the circumferential groove and normals 1 erected at edges of an opening of the circumferential groove are equal to each other, and the angels δ are set in a range of 5°-40°.

When the tire is mounted on the vehicle with the circumferential groove 41a arranged on the axially outer side of the vehicle, as shown in FIG. 12a, the groove walls 47b, one of the opposed groove walls 47a and 47b, is inclined from the groove bottom to the surface of the tread. There is a gradual increase in the width of the groove, and the other groove wall 47a is inclined from a location P positioned radially outside the groove bottom to the surface of the tread to gradually increase the width of the groove. The groove wall 47a is inclined more greatly than that of the groove wall 47b. Further, the groove wall 47a is inclined from the location P to the groove bottom to gradually increase the width of the groove. It is preferable that the angles $\alpha$, $\beta$ and $\gamma$ defined between the groove walls 47a and 47b and the normals 1 are: $\alpha=10°-50°$, $\beta=0°-25°$ and $\alpha>\beta$ difference between $\alpha$ and $\beta$ is 25°-45° and $\gamma=10°-40°$. Also, the depth H of the groove, and the distance h from the surface of the tread to the location P are H=6-9 mm and h/H×100=10-70%. The wall grooves of the circumferential grooves 41c may be formed symmetrically with the circumferential groove 41a with reference to the equator X—X to have the construction described in relation to FIG. 12a.

As shown in FIG. 12c, the auxiliary circumferential groove 45 is made narrow so that the opposed groove walls may contact each other during running.

It is preferable that the width $W_1$ of an opening of the circumferential groove 41a, the width $W_2$ of openings of the circumferential grooves 41b and 41c, and the width $W_3$ of an opening of the auxiliary circumferential groove 45 satisfy the following relationships: $W_2=0.6\times W_1 \sim 1.4\times W_1$ and $W_3=0.05\times W_2 0.2\times W_2$.

The other construction of the tire according to the present invention may be similar to that in the conventional tire.

That is, a carcass is at least one (three at the maximum) turn-up ply which is turned up around each of bead cores from an axially inside to an axially outside of the tire. As the carcass, a ply in which fiber cords represented by rayon, nylon and polyester are arranged substantially orthogonal to the equatorial plane of the tire (in the radial direction) is used. A belt consists of main belt layers and at least one auxiliary belt layer on the entire width of the main belt layers. The main belt layers consist of at least two belt plies in which non-stretchable cords such as steel cords or aromatic polyamide fiber cords are arranged at an angle of 5°-35° with respect to the equatorial plane of the tire and of which cords are crossed between adjacent plies. At least one auxiliary belt layer has thermally shrinkable cords represented by nylon cords arranged substantially in parallel to the equatorial plane of the tire. The auxiliary belt layer is formed by spirally winding a ribbon containing plural parallel cords around the main belt layers. Then the above-mentioned tread is placed on the auxiliary belt layer.

The above embodiment is symmetric with respect to the equator of the tire, but as a matter of course the present invention is advantageously suitable for tires having axially asymmetric tread patterns.

In the above construction, the volume of the grooves great enough for drainage is assured, without deteriorating heat-emitting ability or riding comfortability, by increasing the inclination of the groove wall from a certain location radially outside the groove bottom to the surface of the tread and by inclining the groove wall from the location to the groove bottom to gradually increase the width of the groove. Since the point of inflection is provided at the location radially outside the bottom of the groove, the groove wall functioning as the point of inflection contacts the groove bottom when great lateral forces are applied to the tire. Consequently, any reduction in rigidity of the land portion adjoining this groove wall can be avoided.

As mentioned above, it is preferable to employ the profile of the circumferential groove in which $\alpha = 10° \sim 50°$, $\beta = 0° - 25°$ and $\alpha > \beta$, $\gamma = 10° \sim 40°$, and the groove depth H and the distance h of the position P from the surface of the tread meet $H = 6-9$ mm and $h/H \times 100 = 10-70\%$.

On the other hand, if the angle $\alpha$ exceeds 50°, although the uneven wear resistance during turning is good, the volume of the groove as viewed in section is so small that the drainage performance is deteriorated.

If the angle $\beta$ is less than 0°, rigidity of the block in the land portion 44 is so small that uneven wearing occurs during both turning and ordinary running. Further, if the angle $\beta$ is more than 25°, the drainage performance is conspicuously deteriorated as in the case where the angle $\alpha$ is more than 50°.

If the angle $\alpha$ is less than 10°, the blocks 43 on the shoulder cannot withstand forces during turning, so that the blocks fall down into the main groove 41a (or 41c) to produce uneven wear.

Specific embodiments of the present invention will be explained with reference to the drawings.

FIG. 1 shows the tread pattern as one embodiment of the present invention. An illustration of the internal structure of the tire is omitted here, because the structure is the same as ordinary radial tires.

This embodiment is a tire having a tire size of 205/55 R16 in which the width of the treading surface 1 of the tread is 166 mm. The treading surface 1 of the tread is provided with four circumferential grooves 2 through 5 so that the rows 6 through 10 of the land portions are formed between the adjacent circumferential grooves and between the radially outermost circumferential grooves and the edges of the tread. Among these rows 6 through 10 of the land portions, the rows 6, 8, 9 and 10 of the land portions are constituted by a plurality of block rows consisting of blocks 6a, 8a, 9a and 10a, respectively, which are defined by lateral grooves 12 and lateral grooves 13. The lateral grooves 12 extend from the axially outer edge of the tread in the state that the tire is fitted to a vehicle to a location crossing the second peripheral groove 3. The lateral grooves 13 extend from the axially inner edge of the tread to a location crossing the second circumferential groove 4.

The groove wall 2a of at least the circumferential groove 2 located nearest to the axially outer edge of the tread on the axially outer side of the tire with respect to the equatorial plane X—X of the tire, in FIG. 1, those groove walls 2a and 3a of both the circumferential groove 2 and the circumferential groove 3 adjoining thereto which ar located on the side of the axially outer side of the tread are constituted by the above-mentioned inclined surfaces 2b and 3b and the groove wall portions located radially inside the inclined surfaces 2b and 3b, respectively. Further, the widths of the openings of the circumferential grooves 2 and 3 to the surface 11 of the tread are set in the above-mentioned range.

According to this tire, when a large lateral acceleration acts on the circumferential grooves, as mentioned above, uneven wear resistance and steering stability can also greatly be improved by effectively preventing occurrence of abnormal wearing while sufficiently assuring drainage performance. In addition, as mentioned above, the wet drainage performance and abnormal wear resistance can sufficiently be assured by specifying the range of the width of the openings of the circumferential grooves 2 and 3 to the surface 11 of the tread.

The locations of the radially inner ends of the inclined surfaces 2b and 3b are 10–70%, preferably 20–50%, of the groove depths from the groove bottoms of the circumferential grooves 2 and 3, respectively.

The cross angles between the inclined surfaces 2b and 3b and the normals erected on the surface 11 of the tread are in the range of 25°–60°, preferably 35°–50°. In the illustrated embodiment, the location of each of the radially inner ends of the inclined surfaces 2b and 3b is 37.5% of the groove depth, and the cross angle between each of the inclined surfaces 2b and 3b and the normals of the tire is both 45°.

That is, if the location of the tire-radially inner end of each of the inclined surfaces 2b and 3b is less than 10% of the groove depth thereof, the tire is too alike to the conventional techniques, so that no desired effects cannot be obtained. To the contrary, if the location is more than 70%, the inclined surfaces 2b and 3b are so narrow that necessary and sufficient inclined surfaces 2b and 3b cannot be assured and the desired effects cannot be expected. On the other hand, if the cross angle between each of the inclined surfaces 2b and 3b and the normals is less than 25°, the tire is so like conventional techniques that the intended effects cannot be expected. If the cross angle is more than 60°, there is high likelihood that the inclined surfaces 2b and 3b plane-contact the ground due to application of a vertical load.

As shown in FIG. 2, the groove walls opposed to the groove walls 2a and 3a having the inclined surfaces 2b and 3b, respectively are of course entirely inclined toward the surface of the tread to slightly increase the width of the groove or may be formed in a direction orthogonal to the surface 11 of the tread.

Preferably, the planar shape of each of the blocks 6a, 8a, 9a and 10 of the rows 6, 8, 9 and 10 of the land portions is designed almost rhombic. Particularly, those acute portions of the blocks 6a and 9a located on the axially outer side of the tire beyond the equatorial plane X—X of the tire which adjoin the circumferential grooves 2, 3 are chamfered with inclined surfaces 6b and 9b extending from the surfaces of the blocks to the groove bottoms. The location of the radially inner end of the inclined surfaces 6b and 9b may be, for example, 6.5 mm in depth at which the groove bottom of the lateral groove 12 is located, or may be the bending positions of the groove walls 2a and 3a of the circumferential grooves 2 and 3, respectively. In other words, the location of the radially inner end of the inclined surfaces 6b and 9b may be 5 mm in depth from the surfaces of the blocks in this embodiment.

When the cross angles between the inclined surfaces 6b and 9b thus formed and the normals erected on the surface 11 of the tread are in the range of 30°–60°, particularly 40°–50°, the inclined surfaces can exhibit the same effects as attained by the inclined surfaces 2b and 3b of the circumferential grooves upon those acute corner portions of the blocks which have relatively lower rigidity. Consequently, no entire surface of the blocks floats from the road due to the deformation such as external forces, so that the ground contact plane pressure can be kept constant. Thus, abnormal wear resistance and cornering stability can be improved by using such inclined surfaces 6b and 9b in combination of the inclined surfaces 2b and 3b.

The cross angle of less than 30° is too small to increase that the rigidity of the corner portion of the block. Thus, the effect due to the above combined use cannot be expected.

On the other hand, if the cross angle is more than 60°, for example, the chamfered portion on that side of the lateral groove from which the tire begins to contact the ground exceeds 60° so that the block contacts the ground in a more easily slippable manner. Consequently, the traction, etc. may be damaged, and no effect due to the combined use cannot be expected.

In addition, it is more preferable that in the lateral groove 12 defining the blocks 6a and 9b having the rhombic planar shape, the cross angle between that groove wall portion of each of the block 6a and 9a which forms the acute corner portion and a normal line is greater than that between the wall groove portion forming the obtuse corner zone and a normal line. The rigidity of block can be made uniform in the circumferential direction, although a limitation exists on the cross angle to the normal. In addition, the deformation of the block produced in the circumferential direction by treading forces and kicking forces is restrained, so that the ground contact pressure is made uniform. Thus, abnormal wear due to the above-mentioned external forces is restrained.

The embodiment according to the present invention has been explained with reference to FIGS. 1 and 2. However, for example, as shown in FIG. 5a, the groove walls 2a and 3a of the circumferential grooves 2 and 3 may be constituted by smoothly continuing the radially inner end of the inclined surfaces 2b and 3b to the radially inwardly located groove portions through curved surfaces 2c and 3c, respectively. Alternatively, as shown in FIG. 5b, the groove walls 2a and 3a may be constituted by providing concave curved surfaces 2d and 3d, respectively, instead of the inclined surfaces 2b and 3b.

An embodiment of the invention a tire of a tire size of 205/55 R16 with the tread pattern and the various dimensions shown in FIGS. 1 and 2 and a conventional tire having the same tire size with a tread pattern and dimensions shown in FIGS. 6a and 6b was fitted to a vehicle, and turned on a dry road at a constant radius (radius: 75 m) at a speed of 90 km/H. After about 5 km running, a stepped mount "s" as shown in FIG. 7, that is, the wear amount of edge portions of the land portions axially inside the circumferential grooves 2 and 3 from the surface 11 of the tread were measured with respect to the tire on that front wheel axially outside as viewed in a turning direction which borne the maximum load. This revealed that the worn amounts were 3.5 mm and 4.0 mm in a B—B section and a C—C section of the conventional tire shown in FIG. 6a, respectively, whereas the worn amounts were 0.8 mm and 1.0 mm in a B'—B' section and a C'—C' section in the invention tire shown in FIG. 1, respectively. Similar results were obtained with respect to the tires on the other wheels.

At the same time, handling performance was evaluated by feeling both on a dry road and a wet road, which revealed that the invention tire more firmly grasped the roads, and had sharper reaction in steering. Furthermore, it was confirmed that the gripping forces were improved, although slightly.

For reference, in the tire disclosed in Japanese patent application Laid-open No. 60-193,704, when the cross angle between that groove wall of the circumferential groove which was positioned axially outwardly and the normal to the surface of the tread was 30° and the cross angle between the groove wall located axially inwardly and the normal to the surface of the tread was 10°, stepped amounts as mentioned above were 2.3 mm and 2.8 mm in a B—B section and a C—C section, respectively.

As mentioned above, according to the present invention, uneven wearing of the tire resulting from the lateral acceleration can remarkably effectively be prevented without lowering the drainage performance on wet roads.

Further, a pneumatic tire having a tread pattern as shown in FIG. 11 and a groove structure as shown in FIGS. 12a through 12c with a tire size of 255/40 ZR17 was prepared in trial. All circumferential grooves of this tire had the width of 14 mm and the depth of 8 mm, while all auxiliary circumferential grooves had the width of 4 mm and the depth of 7 mm. All lateral grooves had the width of 4 mm and the depth of 7 mm, and converged toward the equator of the tire at 5°, while the angle between the circumferential groove and the lateral groove was 15°.

The circumferential grooves and the auxiliary circumferential grooves in which the angles $\alpha$, $\beta$, $\gamma$ and $\delta$ shown in FIGS. 12a through 12c were set at 40°, 10°, 30°, and 15°, respectively were formed, while the distance h was set at 5 mm.

A tire having the tread pattern as shown in FIG. 11 and the same tire size with circumferential grooves 41a having the sectional shape shown in FIG. 12b was prepared in trial.

These test tires were evaluated by the uneven wear test, the anti-vibration riding comfortability test, the tread heat generation test and the drainage performance test, and results are shown in the following table.

TABLE

|  | Test tire | Comparative tire |
| --- | --- | --- |
| Uneven wearing | 50 | 100 |
| Anti-vibration riding comfortability | 100 | 100 |
| Tread heat generation | 100 | 100 |
| Drainage performance | 99 | 100 |

The tests were carried out by using an ordinary size passenger car with one driver with the internal pressure of the tire 2.6 kg/cm$^2$. The evaluation results were shown by index by taking the test results of the comparative tire as 100. The smaller the index, the more excellent the result.

In the uneven wearing test, the tire was evaluated by a worn step measured after running over 30 km at a vehicle speed of 100 km/h around a real round test course of 0.7 km/per one circle In the anti-vibration riding comfortability test, vertical accelerations and noises were measured in the vehicle at the vehicle speed of 40–120 km/h while the vehicle was run on surface roughness-varying roads including asphalt roads, concrete roads, etc.

In the tread heat-generating test, the tire was run on an indoor drum tester under a load of 570 kg at a camber angle of 3°. The speed was stepped up 10 km/h by 10 km/h starting from 15 km/h until the tire was damaged. The heat generation was evaluated by the damage-occurred speed and time.

In the drainage performance test, the performance was evaluated by the lateral acceleration generated when the tire entered a water film having a depth of 10 mm on the test course while the vehicle was turning at the vehicle speed of 100 km/h.

According to the present invention, the uneven wearing of the tire resulting from the lateral acceleration, particularly during turning at high speed, can advantageously be prevented without sacrificing the drainage performance, the riding comfortability or the tread heat emission ability.

What is claimed is:

1. A high performance radial pneumatic tire for a passenger car, comprising: a tread provided with a plurality of substantially straight circumferential grooves extending in a circumferential direction of the tire, a plurality of inclined lateral grooves across the circumferential grooves, and plural rows of land portions defined among the circumferential grooves, the lateral grooves, and both edges of the tread, wherein at least the circumferential groove to be located nearest to an axially outer side edge of the tread on a treading surface thereof when the tire is fitted to the passenger car has an axially inner wall and an axially outer wall, and said axially outer wall is inclined more greatly with respect to a normal erected on the tread surface than said axially inner wall and the radially inner portion of the axially outer wall to gradually increase a width of the groove to a surface of the tread from a position spaced from 10–70% of a depth H of the circumferential groove radially outwardly from a bottom thereof, and a width of an opening of the circumferential groove to the surface of the tread is in a range of 3–18 mm.

2. The pneumatic radial tire according to claim 1, wherein said location is spaced by 20–50% of the depth of the circumferential groove radially outwardly from the bottom of the groove.

3. The pneumatic radial tire according to claim 1, wherein a cross angle between said erected normal and said inclined portion of said axially outer groove wall is 25°–60°.

4. The pneumatic radial tire according to claim 3, wherein said cross angle is 35°–50°.

5. The pneumatic radial tire according to claim 1, wherein each row of the land portions is constituted by blocks having a substantially rhombic shape.

6. The pneumatic radial tire according to claim 5, wherein an acute corner portion of each of the blocks in the row of the land portion to be located axially outside the circumferential groove of the tread is chamfered with an inclined surface extending radially inwardly from a surface of the block.

7. A high performance radial pneumatic tire for a passenger car, comprising; a tread provided with a plurality of substantially straight circumferential grooves extending in a circumferential direction of the tire, a plurality of inclined lateral grooves across the circumferential grooves, and plural rows of land portions defined among the circumferential grooves, the lateral grooves, and both edges of the tread, wherein at least the circumferential groove to be located nearest to an axially outer side edge of the tread on a treading surface thereof when the tire is fitted to the passenger car has an axially inner wall and an axially outer wall, and said axially outer wall is inclined more greatly with respect to a normal erected on the tread surface than said axially inner wall to gradually increase a width of the groove to a surface of the tread from a position P spaced from the tread surface a distance h 10–70% of a depth H of the circumferential groove, a width of an opening of the circumferential groove to the surface of the tread is in a range of 3–18 mm, and wherein an axially inner groove wall of the circumferential groove to be located axially outside the tire with respect to an equator of the tire in the state that the tire is fitted to a vehicle is inclined to gradually increase the width of the groove from the bottom of the groove to the surface of the tread, and axially outer groove wall has a first portion which is inclined more greatly than that of said axially inner groove wall of the circumferential groove to gradually increase the width of the groove from the position spaced radially outside the bottom of the groove to the surface of the tread, and a second portion of the axially outer groove wall is inclined to gradually increase the width of the groove from the position to the bottom of the groove.

8. The pneumatic radial tire according to claim 1, wherein $\alpha = 10°-50°$, $\beta = 0°-25°$ and $\alpha > \beta$, and $\gamma = 10°-40°$, depth H of the groove = 6–9 mm, $\alpha$, $\beta$, $\gamma$ being:

$\alpha$: a cross angle between an extension of said the first portion axially outer groove wall and a normal erected on the surface of the tread, $\beta$: a cross angle between an extension of said axially inner groove wall and a normal erected on the surface of the tread, and $\gamma$: a cross angle between an extension of that second portion of said axially outer groove wall which is inclined to gradually increase the width of the groove from the certain location to the bottom of the groove and said normal erected on the surface of the tread.

9. The pneumatic radial tire according to claim 7, wherein the tread is provides with a number of parallel lateral grooves extending across the circumferential grooves.

* * * * *